(12) United States Patent
Lan et al.

(10) Patent No.: US 6,528,466 B1
(45) Date of Patent: Mar. 4, 2003

(54) SOLID OXIDIZER WITH DISSOLUTION INDICATOR

(75) Inventors: Tian Lan, Marietta, GA (US); Christopher L. Reed, Loganville, GA (US); Thomas M. Lachocki, Duluth, GA (US); P. Kirk Mitchell, Marietta, GA (US)

(73) Assignee: Biolab Services, Inc., Wilmington, DE (US)

( * ) Notice: Subject to any disclaimer, the term of this patent is extended or adjusted under 35 U.S.C. 154(b) by 0 days.

(21) Appl. No.: 09/638,987

(22) Filed: Aug. 15, 2000

(51) Int. Cl.$^7$ ............................................... C11D 77/04
(52) U.S. Cl. ...................................... 510/191; 510/192
(58) Field of Search ................................ 510/191, 192, 510/193

(56) References Cited

U.S. PATENT DOCUMENTS

| | | | | |
|---|---|---|---|---|
| 2,451,022 A | * | 10/1948 | Dohrmann | 167/13 |
| 3,867,101 A | * | 2/1975 | Herring | 23/267 A |
| 4,200,606 A | | 4/1980 | Kitko | 422/37 |
| 4,248,827 A | | 2/1981 | Kitko | 422/37 |
| 4,269,723 A | * | 5/1981 | Barford et al. | 252/106 |
| 4,353,866 A | | 10/1982 | Wong | 422/37 |
| 4,384,869 A | | 5/1983 | Wong | 8/527 |
| 4,420,412 A | * | 12/1983 | Wong | 252/186.38 |
| 4,435,857 A | * | 3/1984 | Meloy | 4/222 |
| 4,450,594 A | * | 5/1984 | Hotchkin | 4/228 |
| 4,460,490 A | * | 7/1984 | Barford et al. | 252/92 |
| 4,536,367 A | | 8/1985 | Hung et al. | 422/37 |
| 4,536,368 A | | 8/1985 | Hung et al. | 422/37 |
| 4,578,207 A | * | 3/1986 | Holdt et al. | 252/134 |
| 4,595,536 A | | 6/1986 | Hung et al. | 260/394 |
| 4,632,783 A | | 12/1986 | Hung et al. | 260/394 |
| 4,683,072 A | * | 7/1987 | Holdt et al. | 252/102 |
| 4,800,066 A | * | 1/1989 | Sinclair et al. | 422/55 |
| 5,205,955 A | * | 4/1993 | Bunczk et al. | 252/102 |
| 5,817,611 A | * | 10/1998 | Cooper | 510/192 |
| 6,184,192 B1 | * | 2/2001 | Klinkhammer | 510/191 |
| 6,192,524 B1 | * | 2/2001 | Black | 4/225.1 |
| 6,211,128 B1 | * | 4/2001 | Black | 510/191 |

FOREIGN PATENT DOCUMENTS

| | | |
|---|---|---|
| EP | 0 999 263 A1 | 7/1999 |
| WO | PCT WO 98/57544 | 6/1998 |
| WO | PCT WO 00/23558 | 10/1999 |

* cited by examiner

Primary Examiner—Gregory Delcotto
Assistant Examiner—John M Petruncio
(74) Attorney, Agent, or Firm—Woodard, Emhardt, Naughton, Moriarty & McNett (57) ABSTRACT

A method of providing a solid oxidizer to a tank of water, while also providing a way to indicate when it is time to add more oxidizer. The preferred method includes providing the solid oxidizer in the form of an oxidizer shell with a coloring agent disposed therein. The coloring agent is substantially color stable when stored in the oxidizer shell, and the oxidizer shell is formed and shaped to enclose the coloring agent in a manner in which the coloring agent is prevented from dispersing into the water until the oxidizer shell is substantially dissolved.

30 Claims, 5 Drawing Sheets

SOLID OXIDIZER WITH DISSOLUTION INDICATOR

The present invention relates generally to solid oxidizer tablets such as those used in toilet tanks, and more particularly to an oxidizer tablet that provides a signal when it is time to add fresh oxidizer to the tank.

BACKGROUND OF THE INVENTION

It is well known to the art to use chemical oxidizers, and particularly halogen-releasing compositions, to clean toilet bowls and tanks. These oxidizers may be used in long-life, solid form by placing a tablet or puck in the tank (or in a dispenser in a tank) where it slowly dissolves to treat the water.

The useful life of these solid compositions is generally determined by the rate at which the oxidizer dissolves into the water. As a general rule then, when solid oxidizer material remains in the tank the oxidizer is still acting to oxidize contaminants, clean surfaces, and in some cases sanitize the water. Accordingly, the user can theoretically determine whether the oxidizer is working in the water by observing whether solid oxidizer remains in the tank.

Since toilet tanks are commonly designed so that the contents are hidden from view, it is generally inconvenient to observe whether solid oxidizer remains in the tank. Thus, products using coloring agents to signal the useful life of the oxidizer have been developed for use in toilet tanks. However, since most coloring agents and pigments are not stable when packaged with oxidizers, it has heretofore been necessary to package the coloring agent and the oxidizer separately.

For example, commercially available products that use two separately packaged tablets (one oxidizing tablet and one color-releasing tablet) include VANiSH® Blue & Bleach (S.C. Johnson & Son, Inc.), CLOROX® Blue & Bleach (The Clorox Company), and 2000 Flushes® (Global Household Brands). All three of these products use C.I. Acid Blue 9, which is unstable when mixed or stored in contact with oxidizers.

A need therefore exists for a single oxidizer puck or tablet that provides a visual indicator of oxidizer activity (as defined by the presence of solid oxidizer) when used in a tank hidden from view. The present invention addresses that need.

SUMMARY OF THE INVENTION

Briefly describing one aspect of the present invention, there are provided solid oxidizer compositions that provide a signal when it is time to add more oxidizer. The preferred compositions comprise an oxidizer shell with a coloring agent disposed therein. The coloring agent is substantially color stable when stored in the oxidizer shell, and the oxidizer shell is formed and shaped to enclose the coloring agent in a manner in which the coloring agent is prevented from dispersing into the water in the tank until the oxidizer shell is substantially dissolved.

One object of the present invention is to provide an oxidizer tablet that provides a signal when the oxidizer is substantially dissolved and needs to be replaced.

Other objects and advantages will be apparent from the following description of the preferred embodiments.

DESCRIPTION OF THE PREFERRED EMBODIMENTS

For the purposes of promoting an understanding of the principles of the invention, reference will now be made to certain preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As indicated above, one aspect of the present invention relates to solid oxidizer compositions that provide a signal when it is time to add more oxidizer to the water. The solid oxidizer is preferably a tablet that can easily be placed in a standard toilet tank. The indicator is preferably a coloring agent contained in a cavity inside the tablet. When the tablet is nearing the end of its useful life (i.e., the tablet is substantially dissolved), the indicator is free to flow from the cavity and can be observed in the water. The consumer then knows it is time to put another tablet in the tank. In alternative embodiments the indicator is not a coloring agent, but is instead a fragrance, or another means for indicating that the tablet is substantially dissolved.

Figure 1:
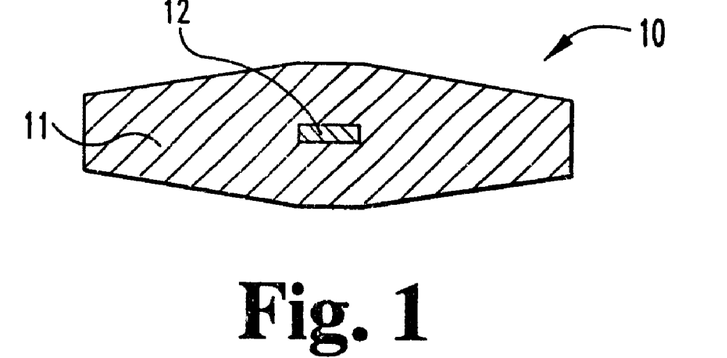
FIG. 1 is a section view of one embodiment of the oxidizer tablet of the present invention.

Referring now to the drawings, FIG. 1 shows one preferred embodiment of the oxidizer tablet of the present invention. Tablet 10 includes an outer shell 11 comprising a solid oxidizer, and a coloring agent 12 disposed in the oxidizer shell. A preferred method of making tablet 10 is disclosed in Example 3 below.

Figure 2:
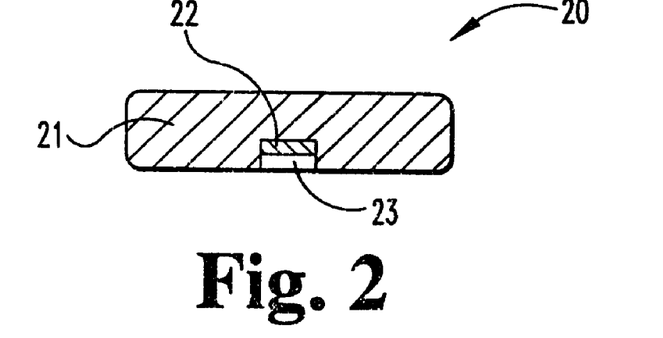
FIG. 2 is a section view of a second embodiment of the oxidizer tablet of the present invention.

FIG. 2 shows an alternative embodiment in which tablet 20 includes oxidizer shell 21, a coloring agent 22, and a sealing material 23. A preferred method of making tablet 20 is disclosed in Example 4 below.

Figure 3:
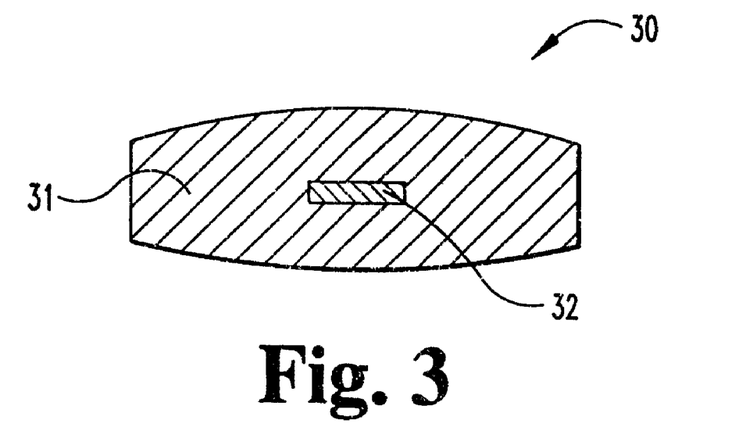
FIG. 3 is a section view of a third embodiment of the oxidizer tablet of the present invention.

FIG. 3 shows a third embodiment in which tablet 30 includes oxidizer shell 31 and a coloring agent 32.

As to the materials used in the tablets, the shell may be made of any oxidizer that helps reduce contaminants in water and/or cleans the toilet when slowly released into the system. In the preferred embodiments, slow-dissolving formulations of organic or inorganic halogen-source materials are used. Among such organic oxidizers are slow-release formulations of halogenated cyanurates, hydantoins, glycolurils, melamines, amines, azodicarbonamidines, sulfonamides, and phthalimides, including N,N,N-trichloromelamine, N,N,N,N-tetrachloro-glycoluril, N-bromo-N,N-dichlordimethyglycoluril, N,N'-dibromodimethylglycoluril, 1,3-dichloro-5,5-dimethylhydantoin, 1-bromo-3-chloro-5,5-dimethylhydanoin, 1,3-dibromo-dimethylhydantion, 1,3-dichloro-5-ethyl-5-methylhydantoin, chloro (or dichlor) amine T, chloro (or dichloro)amine B, N-chlorophthalamide, N-bromo-phalamide, 2,5-N,N'-dichloro-azodicarbonamidine hydrochloride, dichloro-sodium-cyanuric acid, trichloro-isocyanuric acid, and dichloro-isocyanuric acid. Among such inorganic materials are slow-release formulations of alkali and alkaline earth metal hypohalides, such as lithium hypochlorite and calcium hypochlorite.

Alternatively, slow-dissolving, non-halogenated oxidizers may be used. For example, slow-dissolving formulations of alkali and alkaline earth metal salts of the peroxy acids are particularly effective. Specific examples of such oxidizers include sodium perborates, sodium peroxides, sodium persulfates, and sodium percarbonates.

The oxidizer shell preferably includes between about 30 and 99% oxidizer material in the formulation, by weight. More preferably, the oxidizer shell comprises between about 50% and 90% dry oxidizer material. Either fine powder or granule material can be used.

As to the indicator portion of the tablet, it is important that the indicator (coloring agent or otherwise) be highly stable to attack by the oxidizing agent. Only then can the indicator be stored in contact with the oxidizer for the relatively long periods of time necessary to manufacture, ship, store, and use the product. Preferably the indicator is stable for at least thirty days when stored in the oxidizer shell. More preferably the indicator is stable for at least ninety days, and most preferably the indicator is stable for at least 180 days.

When a coloring agent is used as the indicator, the coloring agent must be able to provide at least 0.002 absorbence units of color to the system in order for the consumer to detect its presence at the end of the tablet life. Coloring agents that produce lower levels of color in the system will not be detectable by the majority of the consumer population and are therefore inadequate.

Species with these characteristics include the pigments and dyes belonging to the phthalocyanine (with or without metals). Therefore the following pigments are preferred for this application: C.I. 74120, 74300, and 74320, C.I. Acid Blue 249, C.I. Direct Blues 86 and 87, C.I. Ingrain Blues 1, 2, 3, and 5, C.I. Pigment Blues 15:1, 15:2, 15:3, and 17, C.I. Pigment Greens 7 and 37, and C.I. Solvent Blues 25, 24, and 55. Among them, C.I. Pigment Green 7 has been most preferred in testing to date.

In addition to the previously mentioned pthalocyanines, the following class of colorants may provide adequate color in the system:

[Phthalocyanine]—(COONa or SO$_3$Na)$_m$(Cl, F, or Br)$_n$ where m plus n may be equal to or less than 16. In the case of m≧0, no dispersants are necessary for pigment dispersion. The subscript "m" is based on the desired colorant water solubility and resistance to water hardness, while "n" can be selected based on the desired oxidizer stability of the colorant. In a preferred situation, m is 1 to 2 and n is 14 to 15.

Additionally some anthraquinone species have some oxidizer stability. In this category, the coloring agent with some halogenation is more stable in the application. They include but are not limited to C.I. Vat Blue 6 and 11. C.I. Vat Blue 42 and 47 also show stability.

Some inorganic coloring agents have good oxidizer stability and can be used for this application. They include but not limited to any permanganate salt, dichromate salt, and ultramarine blue.

When it is desired not to use a coloring agent as the sole indicator that the oxidizer should be replaced, foaming agents, fragrances, or any material that can provide a signal when the tablet is substantially dissolved can be used in place of, or in addition to, the coloring agent. These alternative indicators must also be stable when stored in contact with strong oxidizers as noted above.

As to the amount of coloring agent (or other indicator) that should be used, the amount of indicator will determine the duration and the intensity of the signal provided to the user. For coloring agents, the goal is to deliver enough of the agent to provide noticeable color in a toilet bowl when the oxidizing composition is almost exhausted. When another indicator is used, the same principle applies.

As noted above, other additives may be included in either the oxidizer shell or the indicator portion of the tablet. These materials may be added for a variety of purposes, including dissolution control, formulation stabilization, water sanitation or clarification, etc. With any of the additives though, it is important to ensure that any formulation components are combined in such a way that they do not cause interference between the activity of the oxidizer and the cue provided by the coloring agent or other indicator.

For example, binders can be optionally included in the formulations to improve the hardness of the block, and subsequently to improve the dissolution profile of the tablet. Here too though, the binder must be stable in the presence of the oxidizer. A variety of binders may be used individually or in combination, including clays such as bentonite or laponite, natural or naturally-derived polymers such as ethyl cellulose, methyl cellulose, sodium carboxymethyl cellulose, hydroxypropyl cellulose, starches, etc., and synthetic polymers such as polyvinyl alcohols, polyacrylate sodium salt, polymethacrylate sodium salt, polyvinyl acetates, polyacrylamides, polyacrylonitriles, and polymalic anhydride.

Dimethylhydantoin (DMH) has been found to be particularly effective as a binder. DMH improves the cohesiveness of TCCA tablets (thus slowing down the rate of dissolution).

Surfactants can also optionally be added to the solid oxidizer tablets. However, it has surprisingly been found that most types of surface-active agents can also be used as efficient and stable binders. Here too, any surfactant that is stable to the oxidizing environment provided by the system can be used. Such surfactants include nonionic surfactants such as ethylene oxide/propylene oxide copolymers, alkylene oxide condensates of fatty acids (or their corresponding sulfates or sulfonates), fatty alcohols, and alkyl substituted phenols; cationic surfactants such as dialkyl dimethyl ammonium chlorides, dialkyl dimethyl ammonium methyl sulfates, methyl-1-alkyl amidoethyl 2-alkyl imidazolinium methyl sulfates, and di-(alkyl)hydroxyethyl methylammonium methosulfates; amphoteric surfactants such as sodium alkylamphoacetate, alkylamidopropyl hydroxy sultaine, alkyl glycinate, cocoamidopropyl dimethyl betaine, and alkyl amphopropionate; and anionic surfactants such as polyethylene-sodium polyacrylate copolymers, sodium lauryl sulfate, sodium lauryl sulfoacetate, sodium dioctyl sulfosuccinate, sodium stearate, calcium stearate, magnesium stearate, other fatty acid salts, sodium lauryl ether sulfate, dodecyl benzene sulfonic acid (or the corresponding sulfonate), alpha olefin sodium sulfonate, sodium 2-ethylhexyl sulfate, alkyl napthalene sodium sulfonates, linear alkylaryl sodium sulfonates, secondary alkane sulfonates, and secondary alkene sulfonates. Of these, the class of anionic surfactants are most preferred. Alkylated diphenyl oxide disulfonates (ADPODs) which are available from Dow Chemical Company, are particularly preferred because they exhibit good stability in hypochlorite bleaches and excellent binding properties for halogenated organic compounds.

Dissolution modifying agents can also optionally be added to the solid oxidizer tablets. The dissolution modifying agents preferably slow down the dissolution rate of the block so that the life of the tablet is extended. In the most preferred embodiments the dissolution control agents are used in conjunction with binders that also slow the rate of dissolution, so that optimal tablet life may be obtained.

The dissolution modifiers can be either organic or inorganic compounds. For example, glycoluril has low solubility and can take up halogen that is released from the oxidizing component of the block system. Glycoluril is therefore preferably used in the tablet formulation to control the dissolution rate of the block.

Alternatives to glycoluril include substituted hydantoins, cyanuric acid, melamines, phthalimide, alkyl-substituted hydantoins, and all types of fatty acids. Examples of inorganic dissolution control agents include: calcium sulfate, magnesium sulfate, aluminum oxide, aluminum hydroxide, zinc sulfate, zinc phosphate, and zinc oxide. Cyanuric acid is preferably used in TCCA formulations, both as a diluent of TCCA and as a dissolution controller due to its lower solubility as compared with TCCA.

Dissolution modifiers that enhance, rather than inhibit, dissolution may also be used, particularly in the coloring agent or other indicator. For example, Alcosperse 602 ND (Alco Chemical) is used to disperse the coloring agent in some preferred embodiments.

Other additives can also be incorporated into the block. For example, sodium sulfate, sodium chloride, and aluminum sulfate may be used. These additives will also take part in controlling the dissolution of the block especially when anionic surfactants or polymers are included in the block formulation.

Water softening or chelating agents may also be included in the shell or the indicator. They can be inorganic salts such as borax, sodium phosphate, sodium carbonate, or organic compounds such as ethylenediaminetetraacetic acid (EDTA), nitrilotriacetic acid, their alkali metal salts, polyacrylates and polymaleates.

Processing aids such as tablet lubricants may also be included in the formulation. For example, boric acid may be used for that purpose.

As to the formation of the tablets themselves, a variety of tablet shapes and designs may be used, subject to the following limitations. First, the tablet must provide a cavity or "shell" for holding the coloring agent or other indicator. Second, the cavity must be provided in the "shell" in a manner in which the coloring agent contained therein will not be released into the water until the tablet is substantially dissolved.

One way of satisfying the above limitations is to form the "tablet" as a sphere, with a cavity near the middle. That shape will minimize the surface area that contacts the tank, so that dissolution will be relatively uniform from the outside in. (It is known that the tablet surface that contacts the tank dissolves more slowly than do tablet surfaces that have water flowing over them.)

Alternatively, the tablet may be shaped in the more conventional "puck" shape, with the cavity being located near one of the circular walls. In this embodiment though, the puck must be placed in the tank with the "coloring agent side" down, so that the coloring agent is not released until the tablet is substantially dissolved.

Alternatively, the coloring agent can be on one of the outer shell circular walls if the coloring agent is protected from water exposure with a water-resistant coating like a wax. The coating would then prevent the coloring agent from releasing to the water until the outer shell is largely dissolved, as long as the tablet is placed "coloring-agent-side" down.

In the more preferred embodiments the tablet is shaped as a "puck" with sloping or curved walls. This embodiment minimizes the surface area that contacts the tank, providing more uniform outer shell dissolution and allowing the coloring agent to be placed in the middle of the puck so that the orientation of the puck in the tank is not important.

Whatever tablet shape is desired, appropriate tabletting techniques such as those utilizing a specially designed die set and a hydraulic press may be used to produce the outer tablet. The dimensions of the tablet (size, height, diameter, & shape) are primarily determined by the application, with tablet dimensions being adjusted to modify the tablet life.

The cavity dimensions are dictated by the amount of color-releasing agent desired to be released. As previously indicated, the amount of coloring agent contained in the tablet will determine (in part) the duration and the intensity of the color introduced into the toilet bowl. The goal is to deliver enough coloring agent to provide noticeable color in a toilet bowl when the oxidizing composition is almost exhausted, and for that colorant to remain in the water long enough to be noticed by the user.

After placing the coloring agent material inside the tablet cavity, a sealing material may be used to fill the remaining cavity space to protect the coloring tablet from premature color release, as mentioned above. The type and amount of sealing material should be such as will ensure that the coloring agent will not be dispersed into the water until the majority of the oxidizing material is dissolved. The coloring tablet and sealing tablet may be made using a die set and appropriate press, as was done to make the oxidizer shell.

It is to be appreciated that all of the previously mentioned properties (overall block mass, block shape, coloring agent placement, coloring agent mass, etc.) are interrelated. Modifications of one characteristic of the block system may affect another characteristic favorably or detrimentally. For example, a toilet block is typically designed to last as long as possible. In order to achieve that, the angle between the outer and center base area should approach zero—allowing slow dissolution rate of oxidizing agent on the base side, which faces the tank bottom. However, if the angle is increased between the outer and center portions of the tablet (which provides more consistent outer-to-inner shell dissolution and subsequently more consistent indicator release, while providing the consumer with an easier application practice) the overall block dissolution rate is increased.

In some preferred embodiments the angle is set at 12.6°. It other preferred embodiments it can range from 2° to 45°, or nonlinear shapes can be used. The diameter of the flat area can be changed depending on the diameter of the block and the required physical position stability required for the application (the manner in which the block "sticks" to the bottom of the toilet tank).

Another desirable characteristic of the block system described above is that the configuration of the block shape is retained throughout product life. The block system performs best when the shape of the block at the time coloring agent is released is similar to the shape before application of the product to the toilet system. When the system functions in this manner, there is a greater likelihood the coloring agent is released at the proper time to accurately signal the end of efficacious life for the product. To meet this requirement, the integrity and hardness of the block have to be sufficient to prevent shape changes during dissolution. Another method that helps achieve this characteristic is formulating the block shell with binders that improve the block cohesiveness, as discussed previously.

In use, the tablet is placed in a tank such as a toilet tank and allowed to dissolve in the water. After the tablet is substantially dissolved, the coloring agent (or other indicator) contained in the tablet is released into the water, providing the consumer with an indication that it is time to replace the oxidizer tablet. The block can alternatively be placed in the tank in a container or dispensing device that ensures appropriate dissolution of the outer oxidizer shell and ensures release of the indicator near the end of the tablet's life.

Reference will now be made to specific examples using the processes described above. It is to be understood that the examples are provided to more completely describe preferred embodiments, and that no limitation to the scope of the invention is intended thereby.

EXAMPLE 1

Determination of Compatibility of Coloring Agents with Oxidizing Systems

The stability of a coloring agent is evaluated by comparing solutions or suspensions of the coloring agent (38.4 ppm, in this case) to the same solutions but with added oxidizer (38.4 ppm coloring agent and 5.8% (w/v) calcium hypochlorite). Visual observation of a significant color change resulting from the addition of oxidizer indicates that the coloring agent is not stable to oxidizer.

The above method simulates the condition under which both coloring agent and oxidizer are present in the toilet water system. The simulation is intended to provide an environment similar to that near the toilet tank water and toilet tablet interface.

When tested as described, C.I. Pigment Green 7 and potassium permanganate were both stable to oxidizer. C.I. Vat Blue 6 and C.I. Pigment Blue 15:1 were both somewhat stable to oxidizer. Other tested coloring agents, including C.I. Acid Blue 80 and C.I. Acid Blue 9, were not stable to oxidizer.

EXAMPLE 2

Determination of Compatibility of Coloring Agents with Oxidizing Systems

The powders of trichloro-s-triazinetrione (TCCA) (70%) and coloring agent (30%) are mixed until homogenous. A drop of water (approximately 0.6 ml) is then placed on the mixture. A long lasting dark blue color at the spot of the water drop indicates good coloring agent stability with the oxidizer. A brown or yellow color indicates the coloring agent is not stable to oxidizer. This method is designed to simulate the coloring agent stability to oxidizer in a dry blend composition.

When tested as described, C.I. Pigment Green 7 and potassium permanganate were both stable to oxidizer. C.I. Vat Blue 6 and C.I. Pigment Blue 15:1 were both somewhat stable to oxidizer. Other tested coloring agents, including C.I. Acid Blue 80 and C.I. Acid Blue 9, were not stable to oxidizer.

EXAMPLE 3

Formation of Sample Blocks

Several methods may be used to make the tablet shown in FIG. 1. In one method, a shell with the cavity is made first, and then a coloring agent is added to fill the cavity. A sealing tablet with the same composition as the outer shell is used to seal the coloring agent inside the oxidizer shell.

Alternatively, 50% of the oxidizing puck shell composition is placed in the die and the surface of the material is leveled off. The coloring agent is then placed on top of the material surface in the center, and the rest of the oxidizing puck shell composition is then added into the die. The appropriate pressure is applied on the whole composition to form the solid tablet. No sealing tablet is required when using this method.

Samples were prepared with the following tablet dimensions. The oxidizing agent shell was 5.8 cm in diameter and 2.2 cm in height. The cavity diameter was 1.3 cm and the depth was approximately 1.3 cm. The coloring agent tablet was 1.3 cm in diameter and 0.1 cm tall.

Trichloro-s-triazinetrione (TCCA) was used as the oxidizing agent shell main component. A surfactant (DOWFAX 3B2D monoalkylated disulfonated diphenyl oxide) was used as an optional binder/tabletting aid. Sodium sulfate was used as an optional tablet component. C.I. Pigment Green 7 was used as the coloring agent.

The composition of the sample blocks was therefore as follows:

| Outer tablet composition | |
|---|---|
| TCCA | 91% |
| Dowfax ® 3B2D | 6% |
| Sodium Sulfate | 3% |
| Inner tablet composition | |
| Graphtol ® Green 5869-3 (C.I. Pigment Green 7) | 100% |

EXAMPLE 4

Formation of Sample Blocks

The tablet shown in FIG. 2 was made with the following tablet dimensions. The oxidizing agent shell was 4.78 cm in diameter and 1.7 cm in height. The cavity diameter was 1.3 cm and the depth was approximately 0.2 cm. The coloring agent tablet was 1.3 cm in diameter and 0.1 cm tall.

TCCA was used as the oxidizing agent in the shell, as well as to make the sealing tablet. Dimethylhydantoin (DMH) was used as a tablet binder, and potassium permanganate was used as the coloring agent. Polyacrylate powder was used to help disperse the coloring agent.

The composition of the sample blocks was therefore as follows:

| Outer tablet composition | |
|---|---|
| TCCA | 60% |
| DMH | 40% |
| Inner tablet composition | |
| Graphtol ® Green 5869-3 (C.I. Pigment Green 7) | 90% |
| Alcosperse ® 602 ND (Polyacrylate powder) | 10% |

EXAMPLES 5 AND 6

Formation of Sample Blocks

The procedure and equipment used to make block 1 was also used to make block 3 in FIG. 3, except a different die set was used to provide a different dissolution profile. Two samples were produced with the following tablet dimensions. The oxidizing agent shell was 5.8 cm in diameter and 1.14 cm in arc height measured from the arc base line to the arc peak. The coloring agent tablet was 1.3 cm in diameter and 0.1 cm tall.

Trichloro-s-triazinetrione (TCCA) was used as the oxidizing agent shell main component. Dimethylhydantoin (DMH) was used as a tablet binder, and aluminum sulfate was used as a filler/formula stabilizer. C.I. Pigment Green 7 and potassium permanganate were used as the coloring agents.

The composition of the sample blocks was as follows:

|  | 5 | 6 |
|---|---|---|
| Outer tablet composition |  |  |
| TCCA | 70% | 63% |
| 5,5-Dimethylhydantoin | 30% | 27% |
| Aluminum sulfate | 0% | 10% |
| Inner tablet composition |  |  |
| Graphtol ® Green 5869-3 (C.I. Pigment Green 7): | 100% | 0% |
| Potassium permanganate | 0% | 100% |

EXAMPLES 7–10

Testing of Sample Blocks

Tablets produced as described in the foregoing examples were added to test toilets. The tablets' delivery of active halogen was tested via analysis of toilet bowl water using an iodometric titration. The color release of the samples was also tested using a UV spectrophotometer on toilet bowl water samples. As indicated in FIGS. 4–7, the tablets released color when the active halogen was almost gone.

As to the specifics of the test, the toilets had 1.6 gallon tanks and were fitted with equipment to automatically flush each toilet at preprogrammed times. The flushing sequence was 10 flushes over a 16 hour time period then an 8-hour period with no flushes. After the 8-hour "no flush" period the toilets started to flush again and samples were taken from the toilet bowl tank after the second flush to measure the oxidizer content via iodometric titration. The water samples visible light absorbence (630 nm=lambda max for C.I. Pigment Green 7) was measured with a Shimadzu UV-2501 PC spectrophotometer with a 1.0 cm path length quartz cell.

Figure 4:
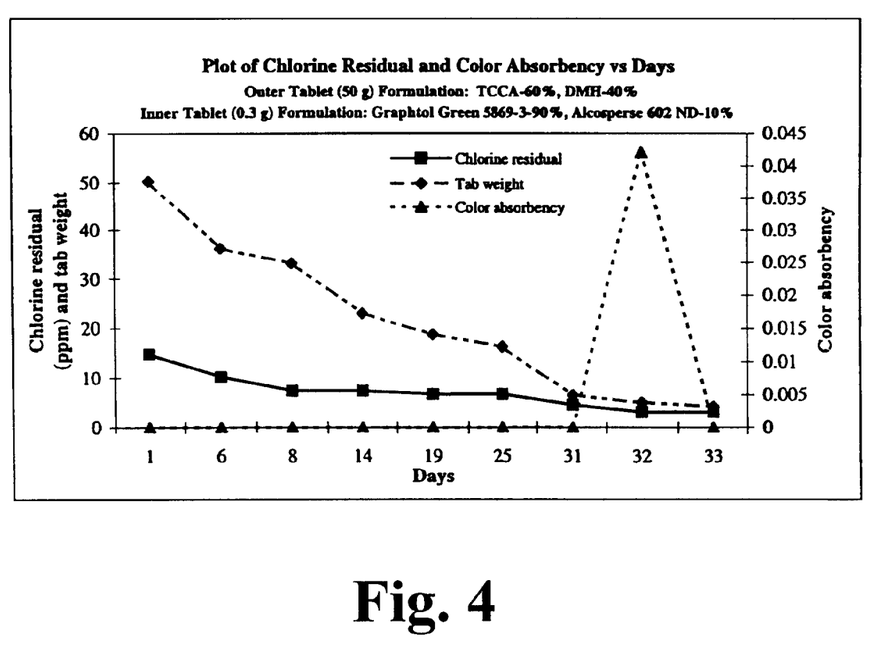
FIG. 4 is a graph of residual chlorine and color absorbency for the tablet of Example 4.
Figure 5:
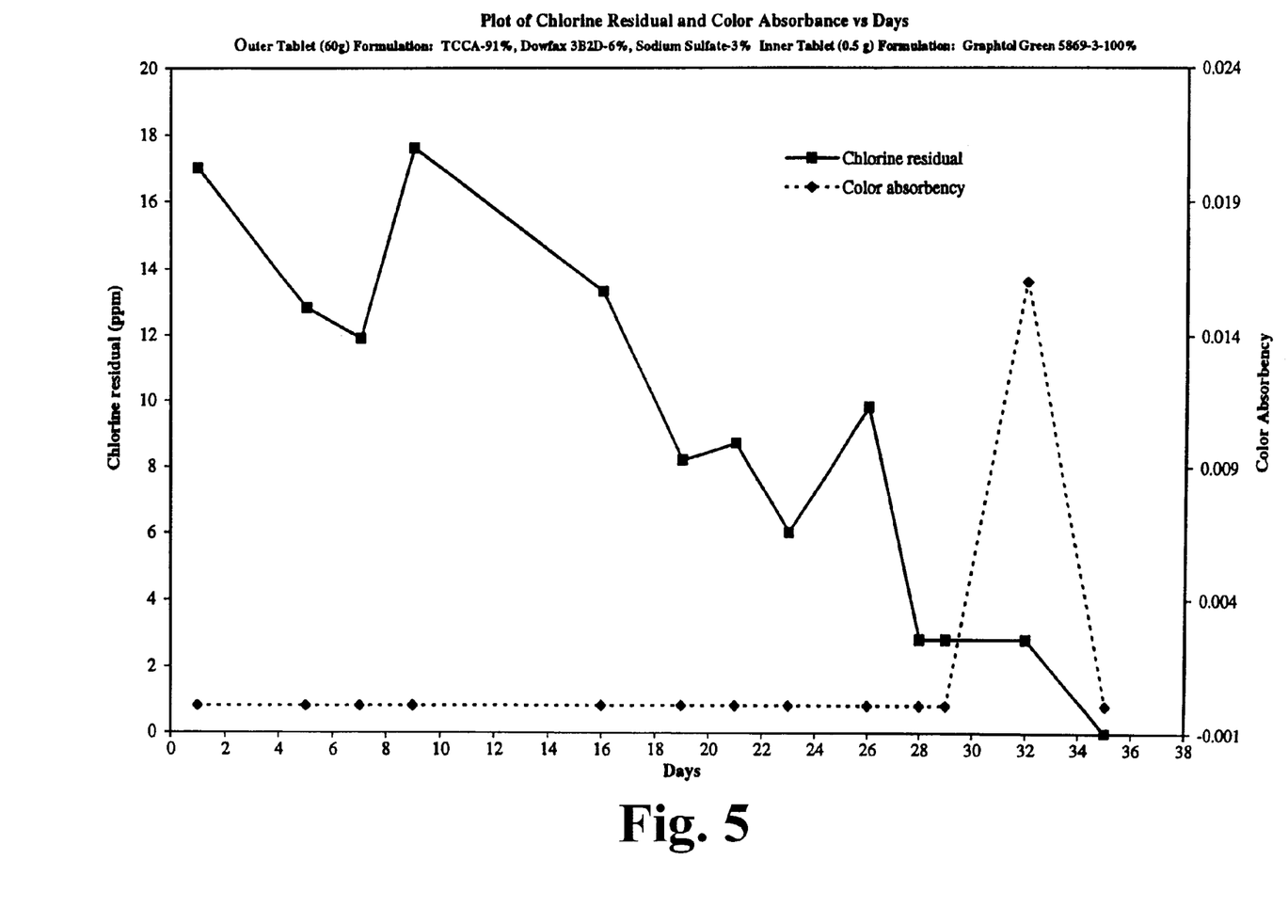
FIG. 5 is a graph of residual chlorine, tablet weight, and color absorbency for the tablet of Example 3.

For the tablets shown in FIGS. 4 and 5 (examples 7 and 8), the color absorbency obtained on the $32^{nd}$ day was measured using a spectrophotometer. The results indicate that the tablet lasted for about a month giving reasonable amount of oxidizer release during the application. The coloring agent was retained within the tablet system until the time at which the oxidizer release level in the bowl was significantly reduced.

The release of color correlated well with the dissolution of the solid oxidizer. Accordingly, the color release signaled the near-termination of oxidizer release, and the imminent end of useful product life. To maintain the efficacy of the oxidizer in the water, a customer would add another tablet to the tank when the coloring agent was observed.

Figure 6:
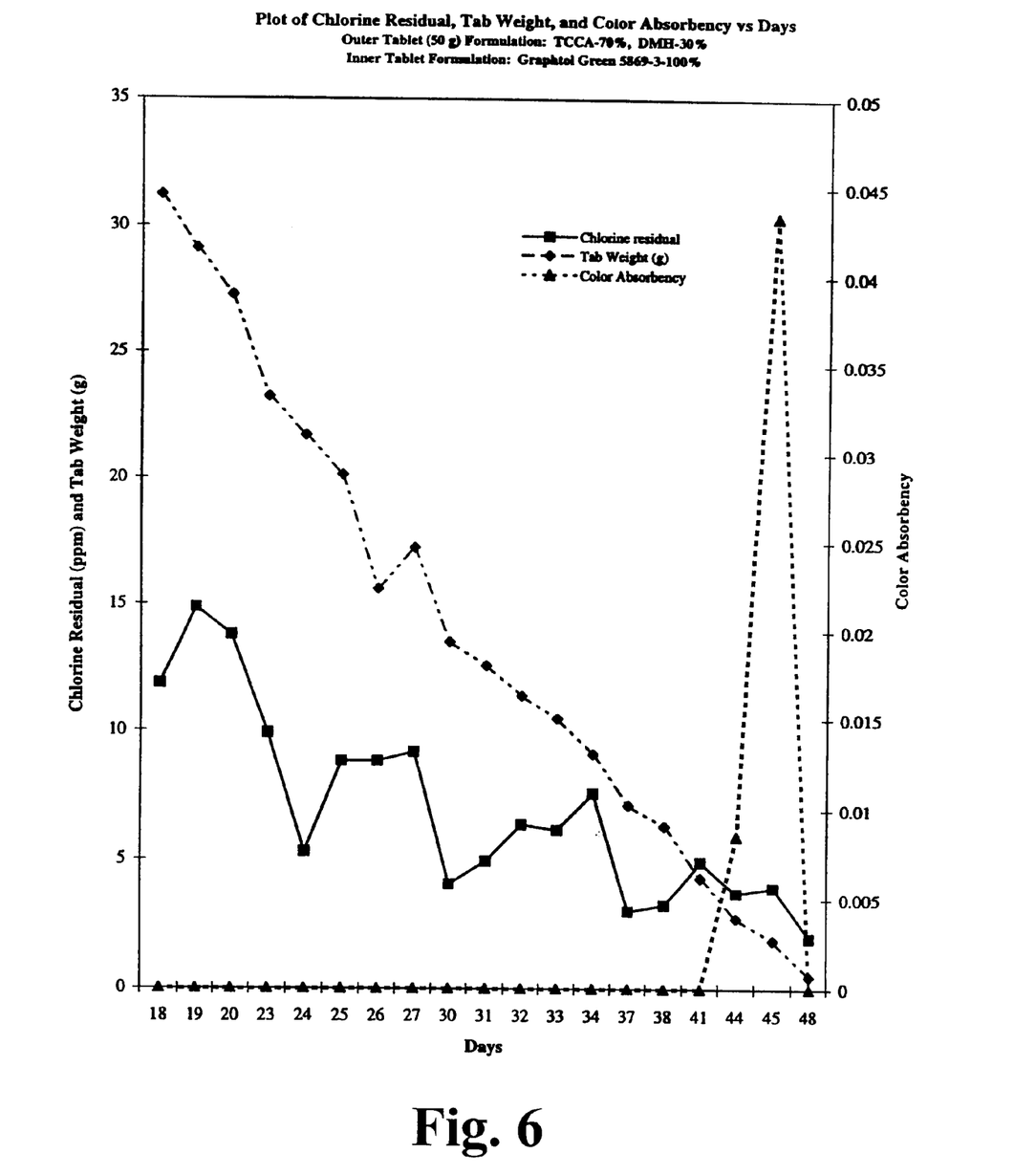
FIG. 6 is a graph of residual chlorine, tablet weight, and color absorbency for the tablet of Example 5.
Figure 7:
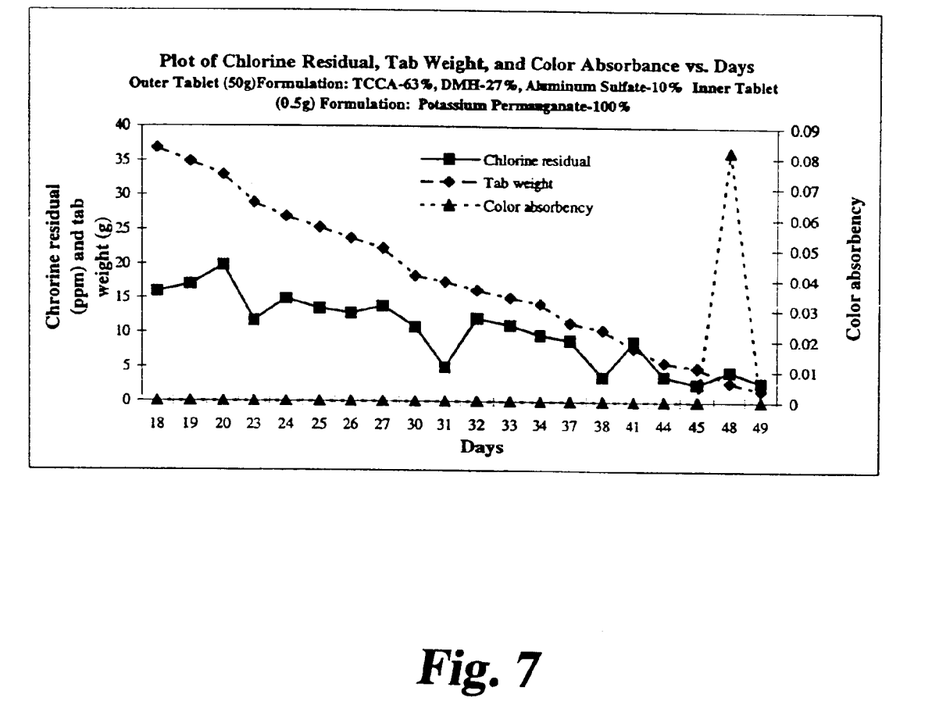
FIG. 7 is a graph of residual chlorine, tablet weight, and color absorbency for the tablet of Example 6.

For the tablets shown in FIGS. 6 and 7 (examples 9 and 10), the oxidizer level and tablet weight data were recorded beginning on the $18^{th}$ day after product application. The data shows that the oxidizer release was continued and maintained at an appropriate level for about 45 days before the inner tablet was exposed to water, releasing color. Again the color release started when the oxidizer level in the toilet was significantly reduced and most of the tablet weight diminished.

The longevity of the tablets in examples 9 and 10 was greater than that in examples 7 and 8. This is because the formulation and methods used in examples 9 and 10 provided a more cohesive tablet that dissolved more slowly in water. In both of those examples though, the color released by the coloring agent was readily visible to the naked eye even when stored in an oxidizer shell for more than 45 days.

EXAMPLE 11

Determination of Required Absorbence

In order to determine the level of color a consumer would need to see if a coloring agent is used as the indicator, a perception test was carried out. A 1000 ppm stock solution of Graphtol® Green was made. From this stock solution 10 different solutions of Graphtol® Green with concentrations ranging from 0 to 10 ppm were made. Eleven individuals were asked to assess each solution, one at a time, for color.

After the perception data was taken, the ten solutions were measured with visible light at 630 nm wavelength for C.I. pigment Green 7 using a Shimadzu UV-2501 PC spectrophotometer with a 1.0 cm path length quartz cell. Comparing the perception data with the absorbence data indicated that the threshold perception range was about 0.002 color absorbence units (test data ranged from about 0.0021 to 0.0026 color absorbence units).

This test indicates that the coloring agent must be able to produce enough color at the end of the overall tablet's life to produce approximately 0.002 units of color absorbence. Further it is preferred that the coloring agent not account for too great a portion of the overall mass of the integrated tablet. For any size tablet, too much mass in the indicator portion of the system will reduce the amount of oxidizer, and thus the cleaning properties.

In an alternative embodiment the coloring agent is not disposed in a shell made of oxidizer, but is provided as a separate portion of a tablet or other solid product. As with the previous embodiment, the coloring agent is in intimate contact with the oxidizer, yet is color-stable when so stored for weeks or even months. C.I. pigment Green 7 and potassium permanganate are the preferred coloring agents for this embodiment as well.

More particularly describing the alternative embodiment, a tablet is formed having a layer of solid oxidizer and a layer of coloring agent, or particles of coloring agent dispersed among oxidizer particles. The oxidizer and coloring agent are formulated so that they are substantially dissolved at about the same time (preferably within several days of each other), so that the coloring agent can be an indicator of oxidizer activity. In this case though, the coloring agent is visible while the oxidizer is working. When the coloring agent is completely dissolved, and can no longer be seen in the water, the oxidizer is also used up and the user knows it is time to replace the tablet.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tablet for treating the water in a water tank, said tablet comprising:
   a shell comprising a slow-dissolving organic or inorganic halogen-source oxidizer; and
   a coloring agent within said shell;
   wherein said coloring agent is substantially color stable when stored in said shell, in that said coloring agent provides at least 0.002 color absorbency units to the water when measured in the visible range with a suitable UV spectrophotometer using a 1.0 cm pass length quartz cell at such time as the oxidizing tablet is substantially dissolved; and
   wherein said shell encloses said coloring agent in a manner effective to prevent the coloring agent from dispersing into the water of a water tank, when the shell is immersed in said tank, until the shell is substantially dissolved.

2. The tablet of claim 1 wherein said coloring agent comprises C.I. pigment Green 7.

3. The tablet of claim 1 wherein said coloring agent comprises potassium permanganate.

4. The tablet of claim 1 wherein said coloring agent comprises a phthaloncyanine-based pigment, or a derivative thereof.

5. The tablet of claim 1 wherein said oxidizer shell comprises trichloroisocyanuric acid.

6. The tablet of claim 1, and further including a dissolution modifier in the oxidizer shell.

7. The tablet of claim 6 wherein said dissolution modifier is glycoluril.

8. The tablet of claim 1, and further including a surfactant in the oxidizer shell.

9. The tablet of claim 8 wherein said dissolution modifier is an alkylated diphenyl oxide disulfonate.

10. The tablet of claim 1, and further including a binder in the oxidizer shell.

11. The tablet of claim 10 wherein said binder is a dimethyl hydantoin.

12. The tablet of claim 1, and further including a dispersant in the coloring agent portion of the tablet.

13. The tablet of claim 12 wherein said dispersant is a polyacrylate powder.

14. A method for providing a water oxidizing composition to a tank of water while simultaneously providing a visual indicator of the activity of the water oxidizing composition, said method comprising providing the water oxidizing composition in the form of an oxidizer shell with a coloring agent disposed therein, wherein said oxidizer shell comprises a slow-dissolving organic or inorganic halogen-source oxidizer; and wherein said coloring agent is substantially color stable when stored in said oxidizer shell, in that said coloring agent provides at least 0.002 color absorbency units to the water when measured in the visible range with a suitable UV spectrophotometer using a 1.0 cm pass length quartz cell at such time as the oxidizing tablet is substantially dissolved; and wherein said oxidizer shell is formed and shaped to enclose said coloring agent in a manner in which said coloring agent is prevented from contacting the water in the tank until the oxidizing shell is substantially dissolved.

15. The method of claim 14 wherein said coloring agent comprises C.I. pigment Green 7.

16. The method of claim 14 wherein said coloring agent comprises potassium permanganate.

17. The method of claim 14 wherein said coloring agent comprises a phthaloncyanine-based pigment, or a derivative thereof.

18. The method of claim 14 wherein said oxidizer shell comprises trichloroisocyanuric acid.

19. The method of claim 14 wherein said oxidizer shell further includes a dissolution modifier in the oxidizer shell.

20. The method of claim 19 wherein said dissolution modifier is glycoluril.

21. The method of claim 14, wherein said oxidizer shell further includes a surfactant.

22. The method of claim 21 wherein said dissolution modifier is an alkylated diphenyl oxide disulfonate.

23. The method of claim 14, wherein said oxidizer shell further includes a binder.

24. The method of claim 23 wherein said binder is a dimethyl hydantoin.

25. The method of claim 14 wherein said water oxidizing composition further includes a dispersant with the coloring agent.

26. The method of claim 25 wherein said dispersant is a polyacrylate powder.

27. The tablet of claim 1 wherein said coloring agent comprises a member selected from the group consisting of pthalocyanines, compounds of the formula (phthalocyanine)—(COONa or $SO_3Na)_m(Cl, F, or Br)_n$ where in plus n may be equal to or less than 16, anthroquinones, permanganate salts, dichromate salts, ultramarine blue, and combinations thereof.

28. The tablet of claim 1 wherein said halogen-source oxidizer comprises between 30% and 99% of the outer shell composition.

29. A tablet for treating the water in a water tank, said tablet comprising:
   a shell comprising a slow-dissolving organic or inorganic halogen-source material; and
   a coloring agent within said shell;
   wherein said coloring agent comprises a member selected from the group consisting of pthalocyanines, compounds of the formula (phthalocyanine)—(COONa or $SO_3Na)_m(Cl, F, or Br)_n$ where m plus n may be equal to or less than 16, anthroquinones, permanganate salts, dichromate salts, ultramarine blue, and combinations thereof,
   wherein said coloring agent is substantially color stable when stored in said shell; and
   wherein said shell encloses said coloring agent in a manner effective to prevent the coloring agent from dispersing into the water of a water tank, when the shell is immersed in said tank, until the shell is substantially dissolved.

30. The method of claim 14 wherein said coloring agent comprises a member selected from the group consisting of pthalocyanines, compounds of the formula (phthalocyanine)—(COONa or $SO_3Na)_m(Cl, F, or Br)_n$ where m plus n may be equal to or less than 16, anthroquinones permanganate salts, dichromate salts, ultramarine blue, and combinations thereof.

* * * * *

UNITED STATES PATENT AND TRADEMARK OFFICE
CERTIFICATE OF CORRECTION

PATENT NO.   : 6,528,466 B1
DATED        : March 4, 2003
INVENTOR(S)  : Tian Lan et al.

It is certified that error appears in the above-identified patent and that said Letters Patent is hereby corrected as shown below:

<u>Column 12,</u>
Line 29, please change "in" to -- m --.

Signed and Sealed this

Twenty-second Day of April, 2003

JAMES E. ROGAN
*Director of the United States Patent and Trademark Office*